(12) United States Patent
Akamatsu et al.

(10) Patent No.: US 7,050,862 B2
(45) Date of Patent: May 23, 2006

(54) SERVO CONTROLLING DEVICE AND METHOD

(75) Inventors: Keizo Akamatsu, Fukuoka (JP); Kazuhiro Tsuruta, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 501 days.

(21) Appl. No.: 10/239,776

(22) PCT Filed: Mar. 26, 2001

(86) PCT No.: PCT/JP01/02427

§ 371 (c)(1),
(2), (4) Date: Dec. 31, 2002

(87) PCT Pub. No.: WO01/73517

PCT Pub. Date: Oct. 4, 2001

(65) Prior Publication Data

US 2003/0139824 A1    Jul. 24, 2003

(30) Foreign Application Priority Data

Mar. 27, 2000  (JP) ............................... 2000-86651

(51) Int. Cl.
*G05B 13/02* (2006.01)

(52) U.S. Cl. .................... 700/29; 700/69; 700/186; 318/560; 318/568.11; 318/568.18

(58) Field of Classification Search ............. 700/29, 700/69, 186; 318/560, 561, 568.11, 568.18

See application file for complete search history.

(56) References Cited

U.S. PATENT DOCUMENTS

| 5,036,266 A | * | 7/1991 | Burke ..................... 318/646 |
| 5,105,135 A | * | 4/1992 | Nashiki et al. ........ 318/568.11 |
| 5,406,182 A | * | 4/1995 | Iwashita ................... 318/560 |
| 5,936,366 A | * | 8/1999 | Hamamura et al. ......... 318/560 |
| 6,744,233 B1 | * | 6/2004 | Tsutsui ..................... 318/560 |

FOREIGN PATENT DOCUMENTS

| JP | 4-064898 | 2/1992 |
| JP | 9-167023 | 6/1997 |
| JP | 9-282008 | 10/1997 |
| JP | 10-177407 | 6/1998 |
| JP | 11-282538 | 10/1999 |
| JP | 11-285970 | 10/1999 |

* cited by examiner

*Primary Examiner*—Leo Picard
*Assistant Examiner*—Douglas S. Lee
(74) *Attorney, Agent, or Firm*—Sughrue Mion, PLLC (57) ABSTRACT

When a position/speed feedback changes while a control system for driving a feed axis uses an integration gain during a shaft stopping, the control system goes unstable to cause a torque instruction to vibrate or diverge. In addition, only a single, narrow-range feed speed can be accommodated to find an out-of-range speed to be insufficient or excessive in compensation effects. After detecting the movement reversal of a feed axis, a control loop is modeled, a virtual internal model computing unit (21) using a constant separate from a constant used in a control loop is configured, a virtual torque instruction (22) computed by this computing unit (21) is added to a torque instruction (16) for driving the feed axis, this adding is terminated when the virtual torque instruction (22) reaches a specified value, and a value (25) of an integrator in a virtual internal model at the adding termination is added to the integrator (14) corresponding to a position/speed feedback loop.

5 Claims, 11 Drawing Sheets

PRIOR ART

FIG.10

PRIOR ART

SERVO CONTROLLING DEVICE AND METHOD

TECHNICAL FIELD

The present invention relates to a servo controlling method for compensating a following delay of a servo system due to influence from friction occurring when a feed axis of a machine tool reverses its moving direction.

BACKGROUND ART

A conventional servo controlling method for compensating a following delay of a servo system due to influence from friction when a feed axis of a machine tool reverses its moving/rotating direction will be described with reference to FIG. 7 that is a block diagram of the servo controlling device described in Japanese Patent Application No. H08-353627 (Japanese Unexamined Patent Publication No. H10-177407) applied by the present applicant.

Figure 7:
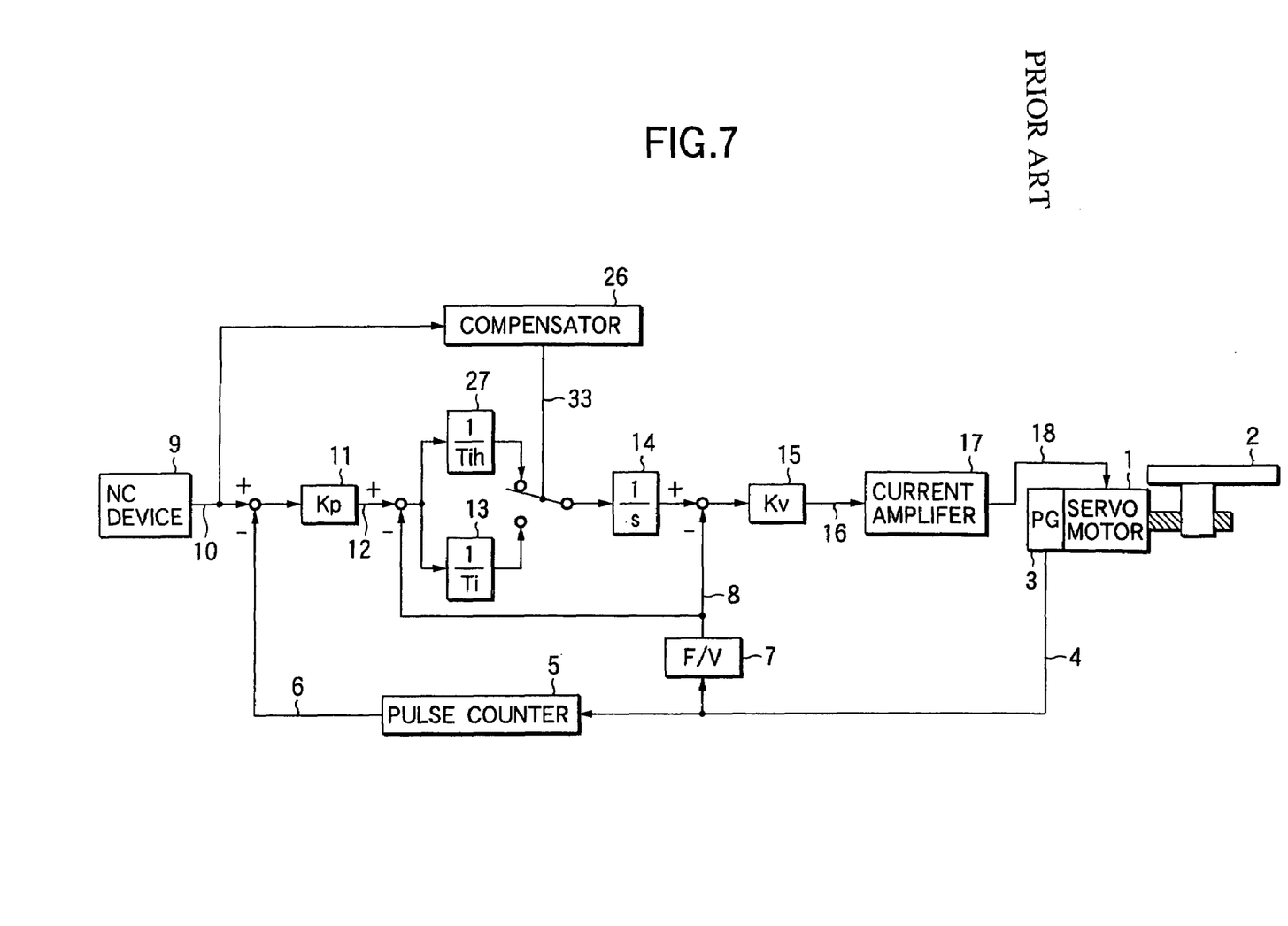
FIG. 7 is a block diagram showing the construction of a conventional servo controlling device.

In FIG. 7, pulse counter 5 counts output pulses 4 outputted from pulse generator 3, and calculates and outputs a position feedback 6 of servo motor 1. F/V converter 7 calculates and outputs a speed feedback 8 of the servo motor based on the output pulses 7 of the pulse generator 3.

A deviation between a position instruction 10 outputted from NC device 9 and the position feedback 6 is multiplied by a position loop gain Kp by multiplier 11, whereby a speed target value 12 is obtained. Integrator 14 integrates values that are obtained by multiplying a deviation between the speed target value 12 and speed feedback 8 by an integration gain 1/Ti or integration gain 1/Tih by multiplier 13 or multiplier 27. Furthermore, a deviation between a value resulting from integration by the integrator 14 and the speed feedback 8 is multiplied by a speed loop gain Kv by multiplier 15, whereby a torque instruction value 16 is obtained. Current amplifier 17 outputs a current 18 corresponding to the torque instruction 16 to the servo motor 1.

Compensator 26 monitors the position instruction 10 outputted from the NC device 9, estimates a quadrant change timing by taking the position instruction 10 and the delay of the feed axis of the machine tool into account, and outputs a changeover signal 33 for changing the integration gain to be multiplied by the speed target value 12 from the integration gain 1/Ti to the integration gain 1/Tih.

Figure 8:
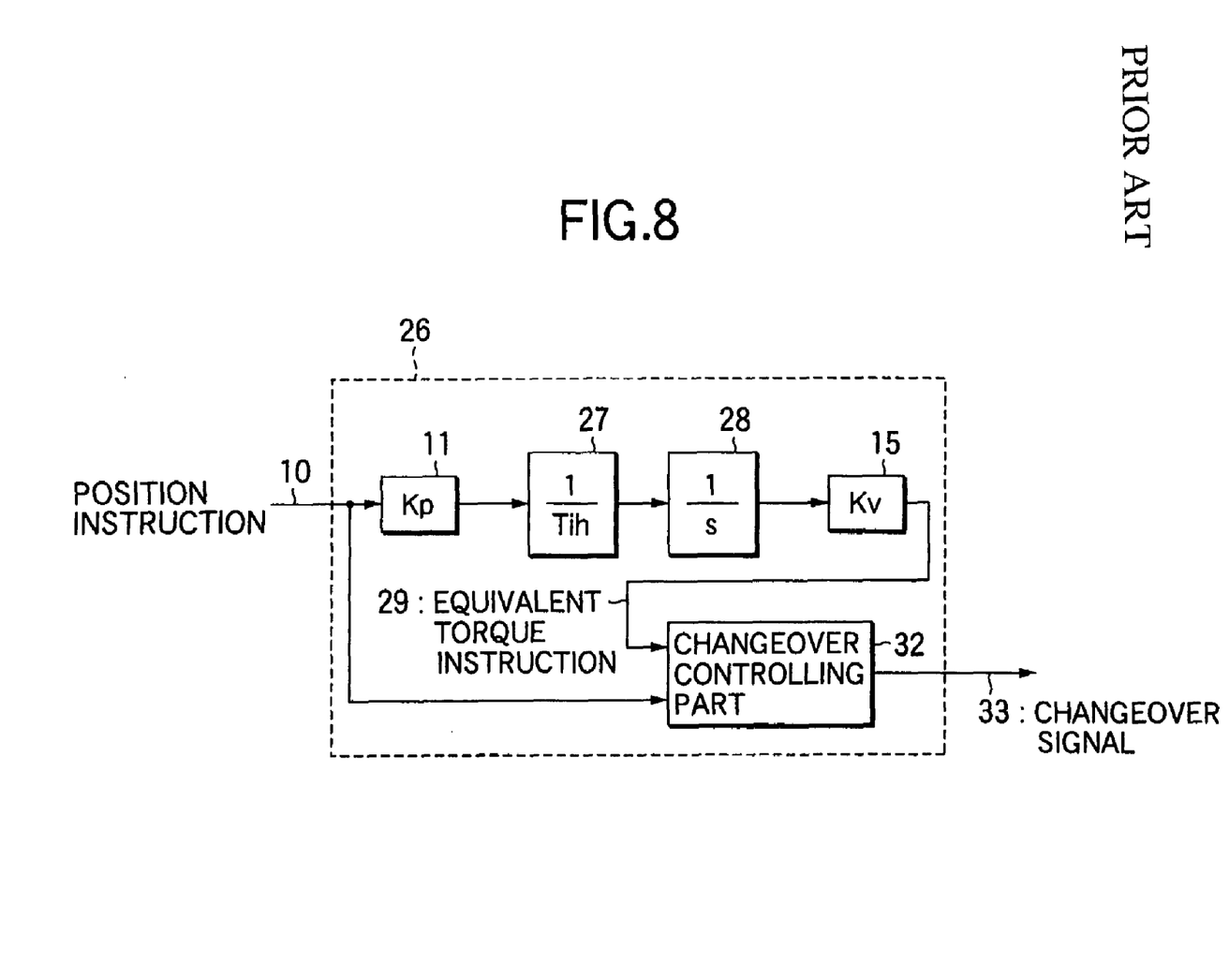
FIG. 8 is an equivalent control block diagram of a compensator 26 in FIG. 7.

FIG. 8 shows an equivalent control block diagram of this compensator 26. The compensator 26 comprises multipliers 11, 15, and 27, integrator 28, and change control part 32.

The multiplier 11 multiplies the position instruction 10 by a position loop gain Kp. The multiplier 27 multiplies the output of the multiplier 11 by the integration gain 1/Tih. The integrator 28 integrates the output of the multiplier 27. The multiplier 15 multiplies the value integrated by the integrator 28 by a speed loop gain Kv to calculate an equivalent torque instruction 29. The changeover control part 32 detects a quadrant change based on the position instruction 20, and outputs a changeover signal 33 so that an integration gain by which the speed target value 12 is multiplied becomes an integration gain 1/Tih. When the equivalent torque instruction 29 reaches a torque at which predetermined compensation is terminated, a changeover signal 33 is outputted so that the integration gain by which the speed target value 12 is multiplied becomes an integration gain 1/Ti.

Figure 9:
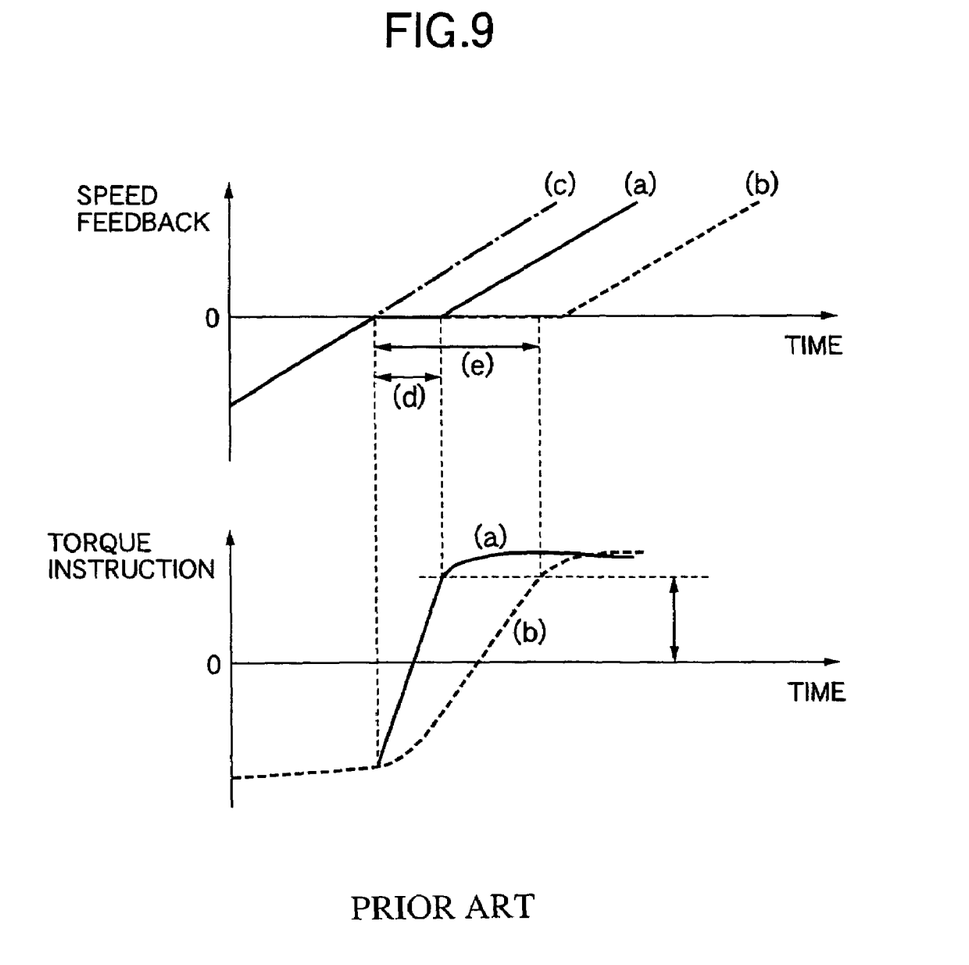
FIG. 9 is an ideal speed and torque waveform chart when the conventional servo controlling device is used.

FIG. 9 shows torque instruction and speed feedback waveforms (a) when the conventional method is used when changing a quadrant, torque instruction and speed feedback waveforms (b) in a case where following delay compensation is not applied, and an ideal speed feedback waveform (c). By the abovementioned method, the integration gain 1/Tih of the multiplier 27 is made larger than the integration gain 1/Ti of the multiplier 13, a torque instruction is quickly generated by which the integration gain 1/Ti of the speed loop is changed to the integration gain 1/Tih only during a period (d) in which the shaft stops to cancel static friction, a period (e) in which the shaft stops in the case where automatic following delay compensation is not applied is shortened to the period (d), whereby the speed feedback waveform is made closer to the ideal waveform (c).

FIG. 7 shows an example of an I-P controlling method, however, there is also a case using a P-I controlling method.

Figure 10:
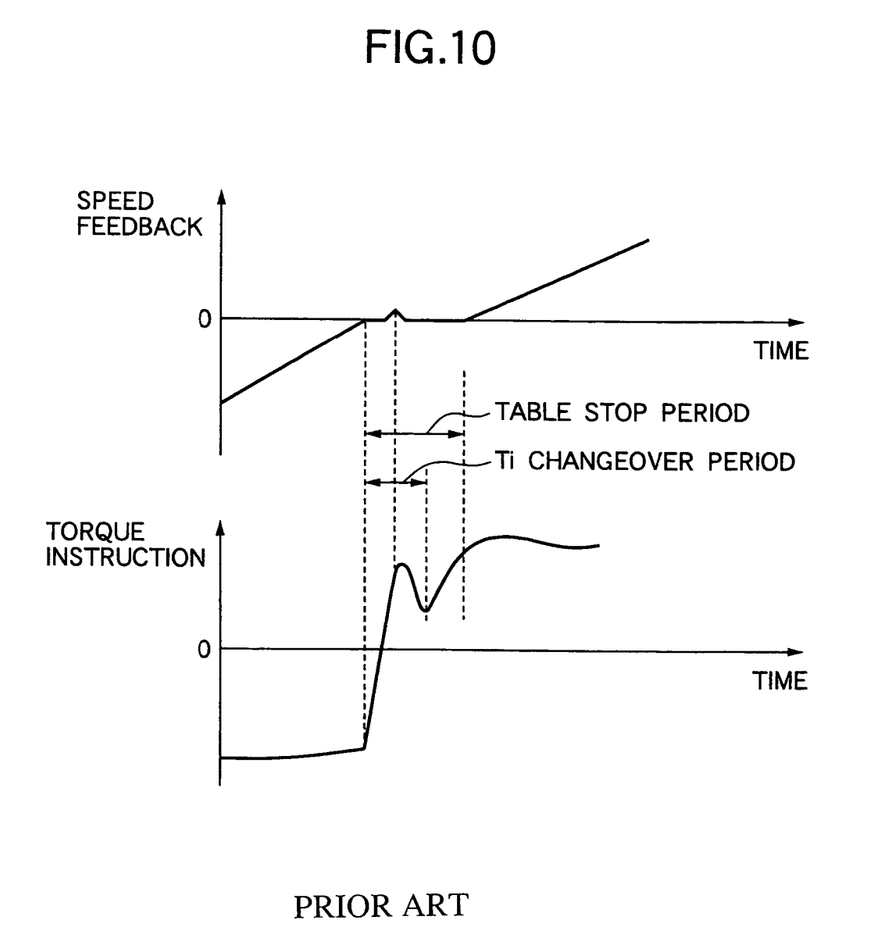
FIG. 10 is a speed and torque waveform chart when the conventional servo controlling device is used and the torque vibrates.

In the conventional method which comprises an equivalent control block and uses compensation conditions obtained from the equivalent control block, the equivalent control block and a control system which drives the feed axis may be different in operation from each other. In such a case, for example, as shown in FIG. 10, when the position/speed feedback changes based on a judgement of the equivalent control block while the control system which drives the feed axis uses the integration gain 1/Tih of the integrator 27 during shaft stoppage, the control system becomes unstable, and the torque instruction vibrates or diverges.

Furthermore, the resolving power of the position/speed feedback is low, torque instruction changes due to changes in position/speed feedback become greater, so that a difference in operation between the equivalent control block and the control system which drives the feed axis becomes conspicuous.

Figure 11:
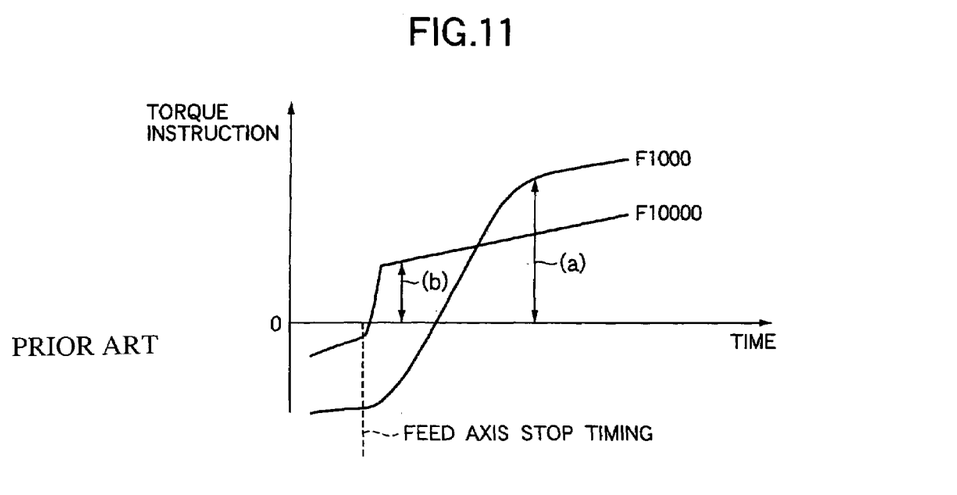
FIG. 11 is a diagram describing that a torque instruction waveform differs depending on the feed speed.
Figure 12:
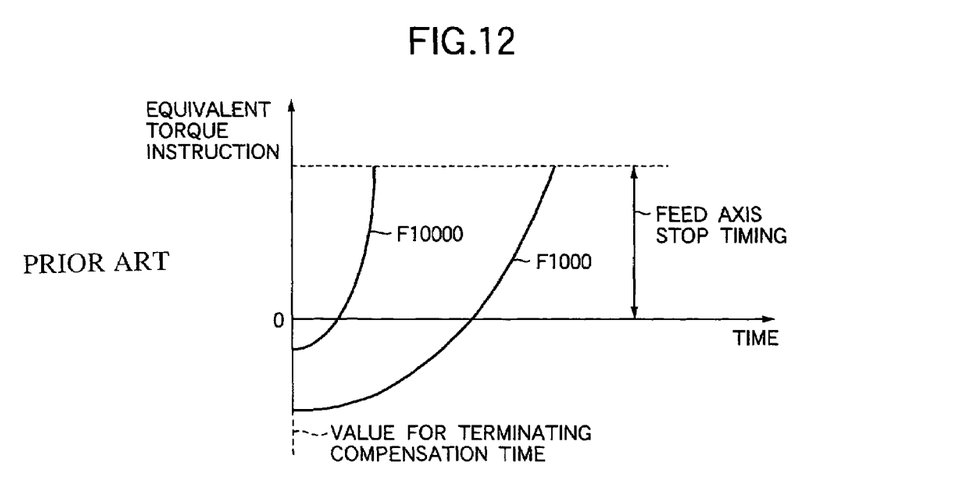
FIG. 12 is a compensation amount waveform chart of the conventional servo controlling device.

In an arc instruction, the torque instruction 16 when the feed axis reverses differs depending on the cutting rate. FIG. 11 shows examples of torque instructions when cutting is carried out with the same arc radius at arc instruction feed speeds of F1000 mm/min and F10000 mm/min without following delay compensation. (a) and (b) in FIG. 11 show torque instruction values when the shaft starts moving in a reverse direction at F1000 mm/min and F10000 mm/min, respectively, wherein the torque instruction value differs depending on the speed. In the conventional method, the torque instruction value is fixed regardless of the speed, and as shown in FIG. 12, the value of the equivalent torque instruction 29 for terminating compensation is also fixed. Therefore, only a single, narrow-range speed can be accommodated, so that compensation effects at an out-of-range speed become insufficient or excessive.

The abovementioned conventional controlling method has the following problems.

(1) When the position/speed feedback changes while the control system for driving the feed axis uses the integration gain 1/Tih during shaft stoppage, the control system becomes unstable and the torque instruction vibrates or diverges.

(2) Only a single, narrow-range speed can be accommodated, and at an out-of-range speed, compensation effects become insufficient or excessive, and the accuracy of loci following control lowers.

DISCLOSURE OF THE INVENTION

An object of the invention is to provide a servo controlling device and method by which high-accuracy loci following control can be carried out by compensating a following delay of a servo system due to influence from friction occurring when a feed axis reverses its moving direction.

In order to solve the above problem (1), according to the invention, by modeling a control loop after detecting a movement reversal of a feed axis, a virtual internal model using constants separate from constants used in a control loop is configured, and a virtual torque instruction calculated in this virtual internal model is added to a torque instruction for driving the feed axis, and when this virtual torque instruction reaches a compensation terminating torque, the adding is terminated, and at this point, a value in an integrator inside the virtual internal model is added to a corresponding integrator of a position/speed feedback.

Furthermore, in order to solve the above problem (2), according to the invention, in addition to the means for solving problem (1), the value of the abovementioned compensation terminating torque is determined as a function of time from the point of movement reversal detection.

A servo controlling device according to the invention, which controls a motor based on an inputted position instruction, comprises:

a position detecting part for detecting the position of a rotor of said motor as a motor position;

a speed detecting part for detecting the speed of the motor;

a position controlling part which outputs a speed instruction so that the motor position corresponds to said position instruction;

a speed controlling part which outputs a torque instruction so that the motor speed corresponds to said speed instruction;

a current controlling part which inputs said torque instruction and drives the motor by controlling a current;

a disturbance estimating part which estimates a motor stop timing tz when it is detected that the motor speed reaches zero by monitoring the motor speed, and outputs an estimated disturbance Cs(t) calculated by $Cs(t) = -Fc_1 + (Cs(tz) + Fc_1)\exp((t-tz)/et_1) - DcVfb(t)$ in a case where $t \leq tz$, or $Cs(t) = Fc_2 + (Cs(tz) - Fc_2)\exp((tz-t)/et_2) + DcVfb(t)$ in a case where $t > tz$ on the assumption that the motor speed is defined as Vfb(t), the viscous friction is defined as Dc, the Coulomb friction when the motor speed is positive is defined as $Fc_1$, the Coulomb friction when the motor speed is negative is defined as $Fc_2$, the value of an estimated disturbance Cs(t) at the timing tz is defined as Cs(tz), the time constant of the estimated disturbance Cs(t) when the motor decelerates and stops is defined as $et_1$, and the time constant of the estimated disturbance Cs(t) when the motor that has decelerated and stopped and then accelerates is defined as $et_2$; and means for adding said estimated disturbance Cs(t) to the torque instruction.

Furthermore, in another motor controlling device according to the invention, on the assumption that an actual torque instruction is defined as Tref(t), an estimated torque instruction is defined as T'ref(t), and a weighting function is defined as w(t), friction parameters Cs(tz), $et_1$, and $et_2$ in the estimated disturbance Cs(t) estimated within the disturbance compensating part are set by using a combination optimizing method such as a genetic algorithm to values which minimize an evaluation function J expressed by:

$$J = \int_a^b w(t)(Tref(t) - T'ref(t))^2 dt \quad (w(t) \geq 0 \text{ and } a \leq t2 \leq b)$$

According to the invention, an estimated disturbance Cs(T) is generated by using various parameters set in advance, and furthermore, friction parameters Cs(t), $et_1$, and $et_2$ for determining an estimated disturbance Cs(t) are set by using a genetic algorithm, and therefore, disturbances including dynamic characteristics can be estimated with high accuracy. Therefore, disturbance compensation for a torque instruction in order to achieve high-accuracy following control can be optimally realized.

BEST MODE FOR CARRYING OUT THE INVENTION

Next, embodiments of the invention will be described in detail with reference to the accompanying drawings.

(First Embodiment)

Figure 1:
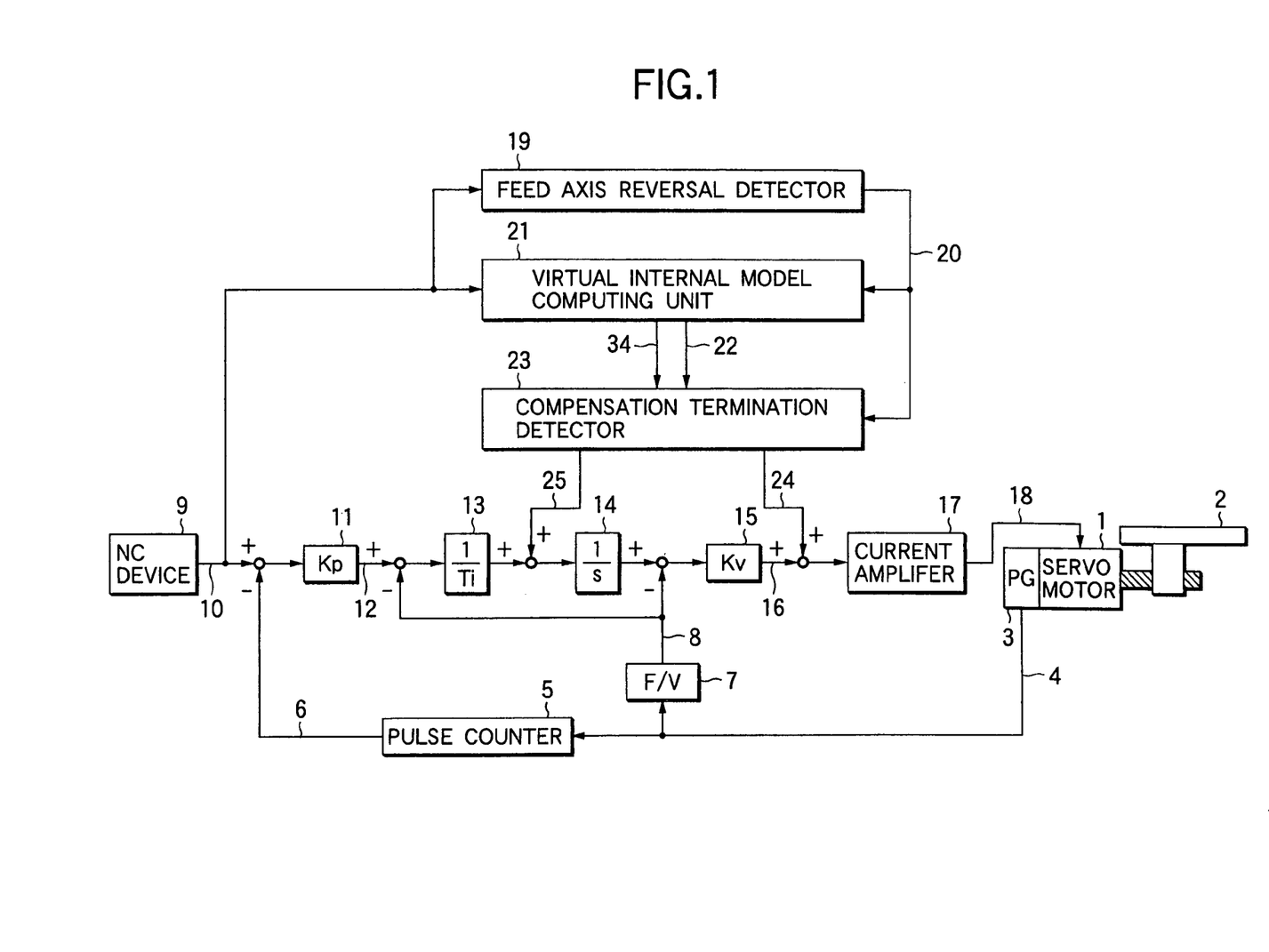
FIG. 1 is a block diagram showing the construction of a servo controlling device of a first embodiment of the invention.

FIG. 1 is a block diagram showing the construction of a servo controlling device of a first embodiment of the invention. In FIG. 1, the same components as those in FIG. 7 are provided with the same reference numerals, and description thereof shall be omitted.

The servo controlling device of the present embodiment is obtained by providing the conventional servo controlling device shown in FIG. 7 with a shaft reversal detector 19, a virtual internal model computing unit 21, and a compensation termination detector 23 in place of the compensator 26 and the multiplier 27.

The feed axis reversal detector 19 outputs a shaft reversal signal 20 by using a position instruction 10.

When the shaft reversal signal 20 is inputted, the virtual internal model computing unit 21 initializes a virtual internal model and outputs a virtual torque instruction 22 by using a position instruction 10.

When the shaft reversal signal 20 is inputted, the compensation termination detector 23 detects compensation termination by using the virtual torque instruction 22 and a time function, and when compensation termination is not detected, the virtual torque instruction 22 is outputted as a compensation amount 24 to be added to a torque instruction of a control loop, and when compensation termination is detected, a value 34 of an integrator 31 that is used in the virtual internal model is outputted as a compensation amount 25 to be added to an integrator 14 of the control loop.

Figure 2:
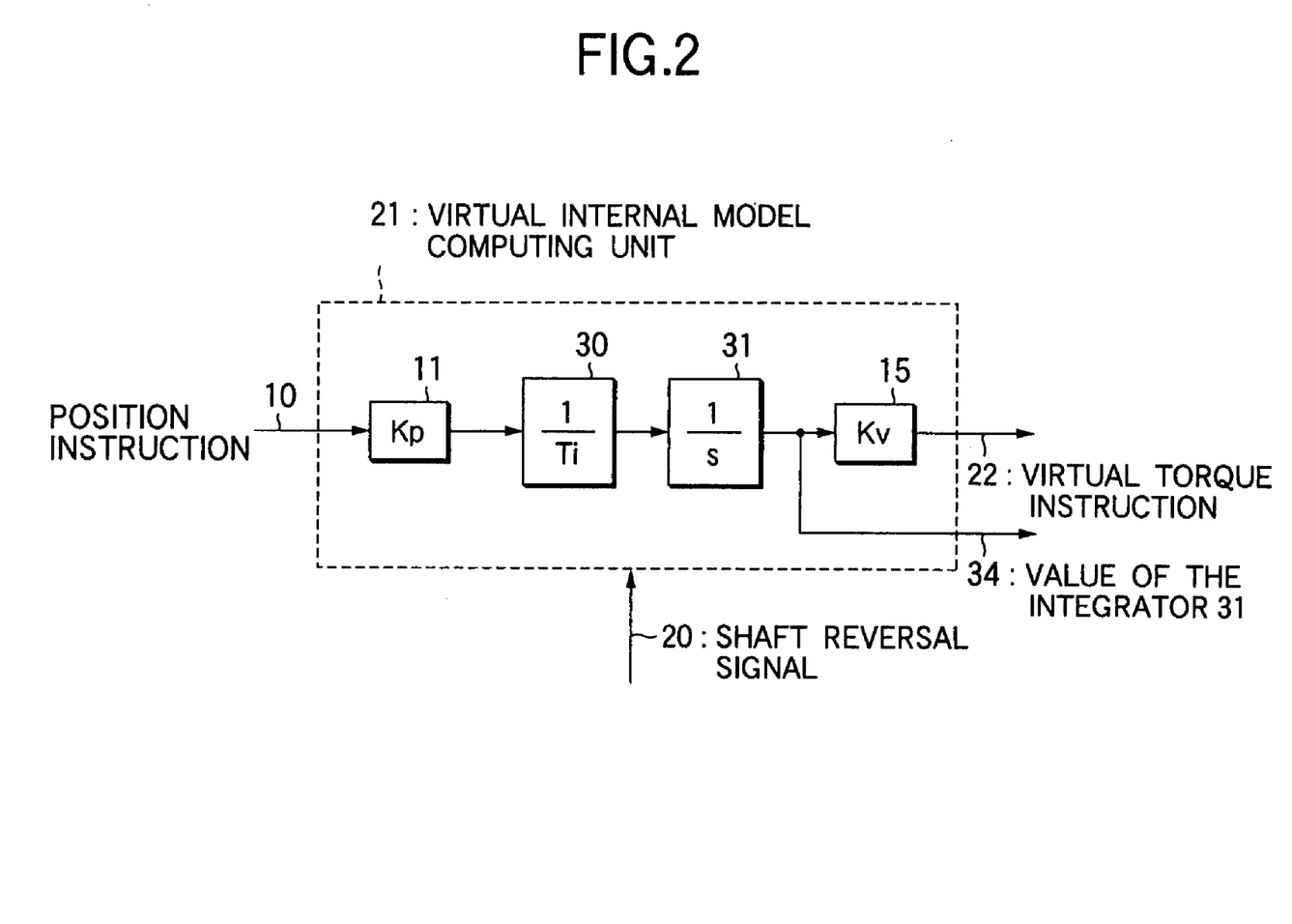
FIG. 2 is an equivalent control diagram of a virtual internal model computing unit 21 of FIG. 1.

FIG. 2 shows the construction of the virtual internal model computing unit 21. Actual compensation is carried out in a period from shaft stoppage to start of shaft reversal movement, and a feedback change at this point is almost zero or slight, so that the feedback change of the virtual internal model is ignored.

This virtual internal model computing unit 21 comprises, as shown in FIG. 2, multipliers 11, 30, and 15 and integrator 31.

An integration gain 1/Tih to be multiplied by the integrator 30 is set to be different from the integration gain 1/Ti (multiplier 13) of the control loop for driving the feed axis, and the same values as the position and speed loop gains used in the control loop for driving the feed axis are used for the position loop gain Kp of the multiplier 11 and the speed loop gain Kv of the multiplier 15.

In the present embodiment, an inertia rigid body is set as a target to be controlled, however, it is also possible to design a more strict virtual internal model as a multiple inertial system by taking influence from viscous friction and disturbance into account.

An example of a function for calculating a compensation terminating torque is shown in the following formula (1).

$$\text{Limit} = \text{Delta Limit} \times t + \text{Limit Offset} \quad (1)$$

Limit: compensation amount determined based on the function
t: time at a condition where the machine table reversal timing is defined as zero
Delta Limit: increase in compensation amount
Limit Offset: compensation offset Formula (1) is a linear function of time using a compensation amount increase Delta Limit and a compensation amount offset Limit Offset based on time as constants.

In the present embodiment, a formula for calculating a compensation terminating torque is described as a simplest linear function, however, functions such as a higher-degree function and an exponential function may be combined and used.

Figure 3:
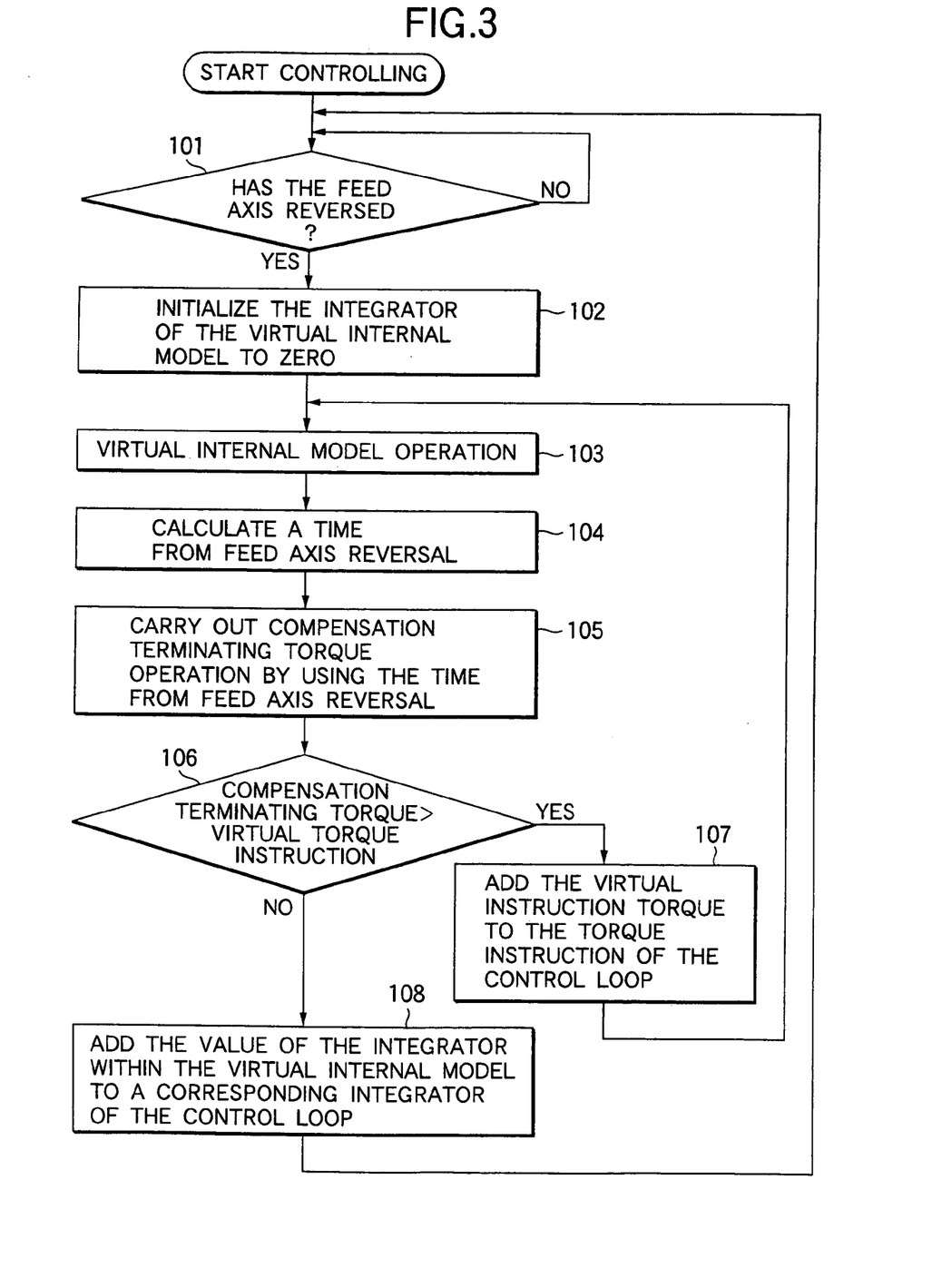
FIG. 3 is a flowchart showing operation of the servo controlling device of FIG. 1.

Operations of the virtual internal model computing unit 21 and compensation termination detector 23 are described with reference to the flowchart of FIG. 3.

A shaft reversal signal 20 is monitored, and reversal of the feed axis is in waiting (step 101). Next, when the shaft reversal signal 20 is inputted, the integrator 14 of the virtual internal model is initialized to zero (step 102). Then, operation of the virtual internal model is carried out by defining the input as a position instruction 10 to calculate a virtual torque instruction 22 (step 103). Then, the time t from the feed axis reversal is calculated (step 104). Thereafter, by substituting a time t from the feed axis reversal in formula (1), a compensation terminating torque Limit is calculated (step 105). The compensation terminating torque Limit is compared with the virtual torque instruction 22 (step 106). When the compensation terminating torque Limit is greater than the virtual torque instruction 22, the virtual torque instruction 22 is added to the torque instruction 16 of the control loop as a compensation amount 24 (step 107). When the compensation terminating torque Limit is less than the virtual torque instruction 22, the value 34 of the integrator 31 of the virtual internal model is added to the output value of the integrator 14 of the control loop as a compensation amount 25, and thereafter, compensation is terminated (step 108).

In the present embodiment, a virtual internal model is configured, and a virtual torque instruction is added to a torque instruction of the control loop, whereby it becomes unnecessary to increase the integration gain of the control loop for driving the feed axis, and the torque does not greatly change even when feedback occurs. Therefore, a torque instruction for moving the feed axis in reverse can be smoothly and continuously generated without vibrations.

Figure 4:
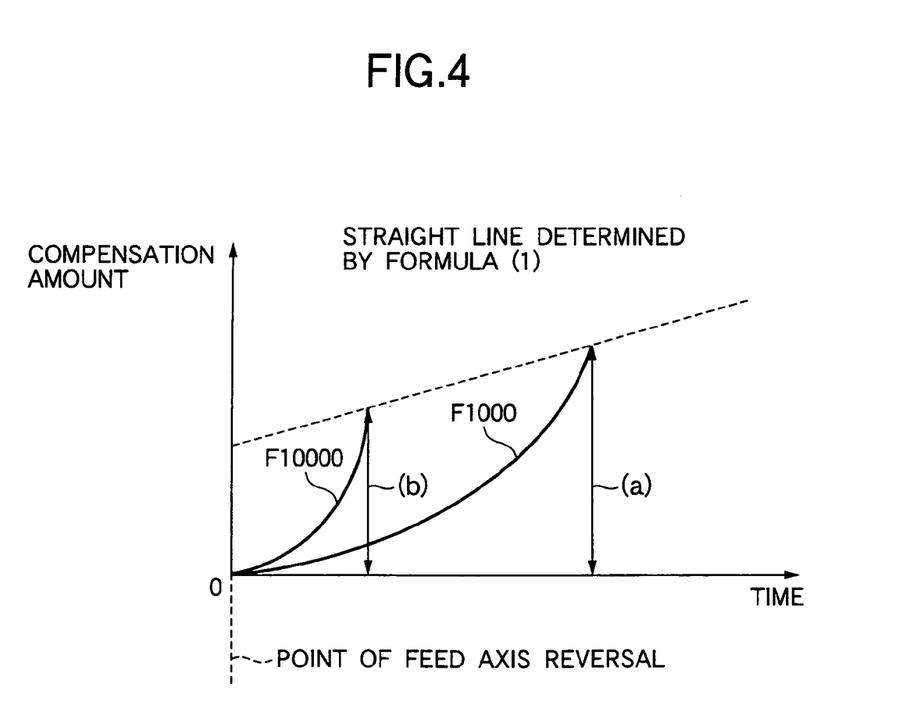
FIG. 4 shows examples of compensation amount waveforms in a case where arcs having the same arc radius at feed speeds F1000 mm/min and F10000 mm/min are instructed in the servo controlling device of the first embodiment of the invention.

Furthermore, by determining compensation terminating conditions based on the virtual torque instruction and time function that change from moment to moment, a compensation amount optimum to a wide-range speed instruction and a position instruction generated based on an arc radius can be added to the torque instruction of the control loop. FIG. 4 shows examples of compensation amount waveforms when arcs with the same arc radius at feed speeds of F1000 mm/min and F10000 mm/min are instructed. (a) and (b) in FIG. 4 show, respectively, compensation amounts at the point of compensation termination when instructions of feed speeds of F1000 mm/min and F10000 mm/min are provided.

At the point of compensation termination, by adding the value of the integrator within the virtual internal model to the corresponding integrator of the control loop, torque changes to be applied to the feed axis after adding of the compensation amount is terminated are eliminated.

(Second Embodiment)

Next, a servo controlling device of a second embodiment of the invention will be described. In the servo controlling device of the abovementioned first embodiment, a compensation amount 24 to be added to the torque instruction 16 is prepared by a compensator (comprising feed axis reversal detector 19, virtual internal model computing unit 21, and compensation termination detector 23) independent from the control loop by using a virtual internal model, so that stable compensation effects can be obtained. Furthermore, by determining optimum compensation terminating conditions with respect to a speed instruction by using a function of time from the point of shaft reversal, uniform compensation effects can be obtained for a wide-range speed instruction.

However, in the servo controlling device of the abovementioned first embodiment, as shown in FIG. 2, the position instruction 10 is multiplied by a position loop gain Kp, and further multiplied by a certain integration gain 1/Tih, and then integrated, and multiplied by a speed loop gain Kv, whereby a compensation amount (virtual torque instruction 22) to be generated by the virtual internal model computing unit 21 is calculated based on a certain time function. However, no friction dynamic characteristics are taken into account in this compensation amount 24, so that it may not be an optimum value. Therefore, the setting must be repeatedly adjusted in order to obtain an optimum compensation amount 24, and furthermore, the setting of the integration gain 1/Tih and the time function is very difficult, and therefore, as a result, required control performance may not be obtained.

Figure 5:
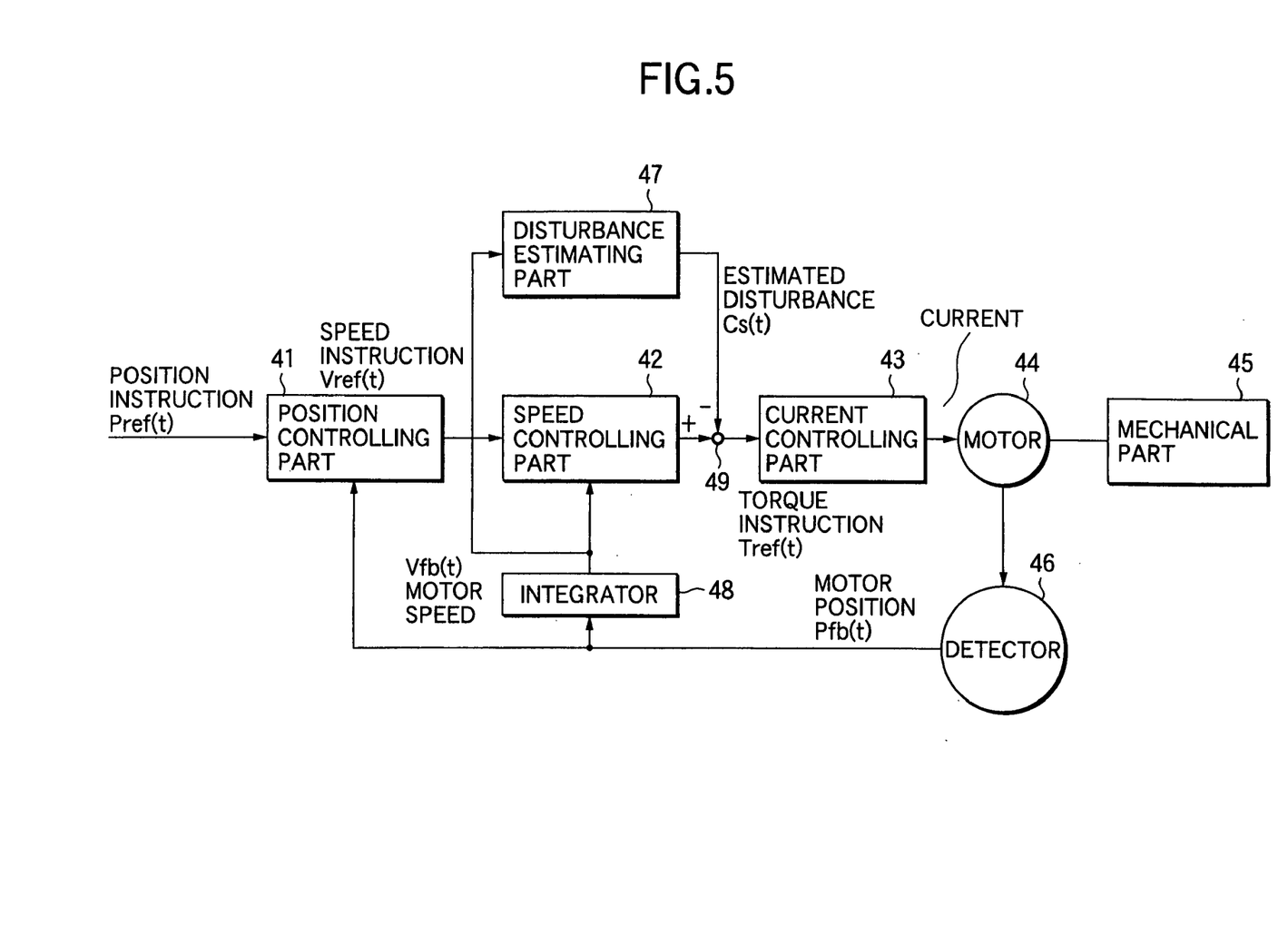
FIG. 5 is a block diagram showing the construction of a servo controlling device of a second embodiment of the invention.

The servo controlling device of the second embodiment is for solving such problems, which comprises, as shown in FIG. 5, position controlling part 41, speed controlling part 42, current controlling part 43, disturbance estimating part 47, differentiator 48, and subtracter 49.

The position controlling part 41 inputs a position instruction Pref(t) and outputs a speed instruction Vref(t) to the speed controlling part 42 so that the motor position Pfb(t) corresponds to the position instruction Pref(t).

The speed controlling part 42 inputs the speed instruction Vref, and outputs a torque instruction Tref(t) to the current controlling part 43 so that the motor speed Vfb(t) corresponds to the speed instruction Vref.

The current controlling part 34 controls the current and drives the motor 44 based on the inputted torque instruction Tref(t). A mechanical part 45 is attached to the motor 44. A detector 46 detects the position of the rotor of the motor 44, and outputs the position as a motor position Pfb(t).

The subtracter 48 outputs a value obtained by subtracting an estimated disturbance Cs(t) from the torque instruction Tref(t) to the current controller 43. The differentiator 48 calculates the speed of the motor 44 based on the motor position Pfb(t), and outputs the speed as Vfb(t).

The disturbance estimating part 47 inputs the motor speed Vfb(t), and outputs an estimated disturbance Cs(t) calculated by using a predetermined formula to the subtracter 49.

Formulas (2) and (3) for determining an estimated disturbance Cs(t) at the disturbance estimating part 47 are shown below.

$$Cs(t)=-Fc_1+(Cs(tz)+Fc_1)\exp((tz-t)/et_1)-DcVfb(t) \text{ in a case where } t \leq tz \quad (2)$$

$$Cs(t)=Fc_2+(Cs(tz)-Fc_2)\exp((tz-t)/et_2)+DcVfb(t) \text{ in a case where } t > tz \quad (3)$$

Herein, the viscous friction Dc and Coulomb frictions $Fc_1$ and $Fc_2$ are determined in advance based on the actual characteristics of the motor 44. Herein, the Coulomb friction $Fc_1$ is a Coulomb friction when the motor speed Vfb(t) is positive, and the Coulomb friction $Fc_2$ is a Coulomb friction when the motor speed Vfb(t) is negative. Cs(tz), $et_1$, and $et_2$ are parameters called friction parameters, and Cs(tz) is a value of an estimated disturbance Cs(t) at a timing tz, and $et_1$ and $et_2$ are time constants for determining an inclination of an increase or decrease in estimated disturbance Cs(t).

When setting these friction parameters Cs(t), $et_1$, and $et_2$, the speed instruction Vref(t), motor speed Vfb(t), and torque instruction Tref(t) are inputted, and a value which minimizes the following evaluation relational expression (4) for calculating an evaluation function J is determined by using a genetic algorithm (GA) so that an actual torque instruction Tref(t) and the estimated torque instruction T'ref(t) correspond to each other.

$$J = \int_a^b w(t)(Tref(t) - T'ref(t))^2 \, dt \quad (4)$$

Herein, $w(t) \geq 0$ and $a \leq tz \leq b$.

w(t) shows a weighting function, and the section [a-b] indicates an evaluation period. As a method for setting optimum parameters using a genetic algorithm, for example, a method disclosed in "Determination of Optimum Control Gains" by Umeda and Oguro, Yaskawa Electric Corporation, Vol. 61, No. 237, p. 222, 1997 may be used.

Figure 6:
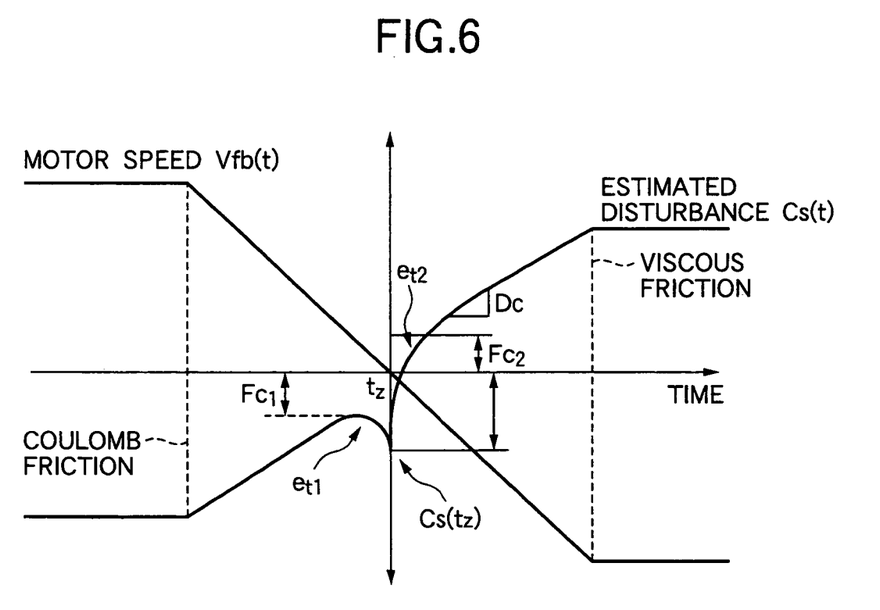
FIG. 6 is a diagram showing changes in estimated disturbance Cs(t) outputted by a disturbance estimating part 7.

Thus, by setting an estimated disturbance Cs(t) in advance at the disturbance estimating part 47, the estimated disturbance Cs(t) that is outputted when the speed of the motor 44 is inverted grows exponentially at a time constant $et_1$ when the speed of the motor 44 decelerates toward zero from a predetermined speed, and becomes a negative inclination disturbance reaching the disturbance Cs(t) at the point at which the speed is zero. On the other hand, in a case where the speed is inverted and the motor accelerates, the estimated disturbance Cs(t) grows exponentially at a time constant $et_2$ from the disturbance Cs(tz) at the point at which the speed is zero, and continuously changes to a value determined by adding a viscous friction disturbance Dc and a Coulomb friction disturbance $Fc_2$ to the disturbance Cs(tz) at the point at which the speed is zero.

Then, since friction parameters Cs(t), $et_1$, and $et_2$ for determining the estimated disturbance Cs(t) are set by using a genetic algorithm, a disturbance containing dynamic characteristics can be estimated with high accuracy. Therefore, when it is demanded to realize highly accurate loci following control, disturbance compensation for torque instructions can be optimally realized. Furthermore, in the present embodiment, a genetic algorithm is used for selecting an optimum combination of friction parameters for the estimated disturbance Cs(t), however, other combination optimizing methods such as a learning control can be used.

INDUSTRIAL APPLICABILITY

According to the invention, the following effects can be obtained.

(1) By compensating a following delay of a servo system due to influence from friction occurring when a feed axis reverses its moving direction, highly accurate loci following control is realized.

(2) Furthermore, compensation in which dynamic characteristics of disturbances typified by frictional properties are taken into account can be carried out, so that highly accurate loci following control is realized.

What is claimed is:

1. A servo controlling method which has a control loop using a position/speed feedback and drives a feed axis of a machine tool, wherein after a movement reversal of the feed axis is detected, a control loop is modeled, and a virtual internal model using constants of values that are different from those of the constants used in the control loop;

a virtual torque instruction calculated in the virtual internal model is added to a torque instruction for driving the feed axis;

when said virtual torque instruction reaches a predetermined value, said adding is terminated; and when the adding is terminated, a value of an integrator within the virtual internal model at this point is added to a corresponding integrator of the position/speed feedback group.

2. The servo controlling method according to claim 1, wherein the predetermined value is determined as a function of time from the point at which the movement removal is detected.

3. A servo controlling device for controlling a motor based on an inputted position instruction, comprising:

a position detecting part for detecting the position of a rotor of said motor as a motor position;

a speed detecting part for detecting the speed of the motor;

a position controlling part which outputs a speed instruction so that the motor position corresponds to said position instruction;

a speed controlling part which outputs a torque instruction so that the motor speed corresponds to said speed instruction;

a current controlling part which inputs said torque instruction and drives the motor by controlling a current;

a disturbance estimating part which estimates a motor stop timing tz when detecting that the motor speed has become zero by monitoring the motor speed, and outputs an estimated disturbance Cs(t) calculated by $Cs(t)=-Fc_1+(Cs(tz)+Fc_1)\exp((t-tz)/et_1)-DcVfb(t)$ in a case where $t \leq tz$, or $Cs(t)=Fc_2+(Cs(tz)-Fc_2)\exp((tz-t)/et_2)+DcVfb(t)$ in a case where $t>tz$, provided that the motor speed is defined as Vfb(t), the viscous friction is defined as Dc, the Coulomb friction when the motor speed is positive is defined as $Fc_1$, the Coulomb friction when the motor speed is negative is defined as $Fc_2$, a value of an estimated disturbance at the timing tz is defined as Cs(tz), a time constant of the estimated disturbance Cs(t) when the motor decelerates and stops is defined as $et_1$, and a time constant of the estimated disturbance Cs(t) when the motor accelerates is defined as $et_2$; and means for adding the estimated disturbance Cs(t) to the torque instruction.

4. The servo controlling device according to claim 3, wherein friction parameters Cs(tz), $et_1$, and $et_2$ in the estimated disturbance Cs(t) estimated in the disturbance estimating part are set by using a combination optimizing method to values which minimize an evaluation function J expressed by $$J = \int_a^b w(t)(Tref(t) - T'ref(t))^2 dt$$

$(w(t) \geq 0, a \leq tz \leq b),$ provided that an actual torque instruction is defined as Tref(t), an estimated torque instruction is defined as T'ref(t), and a weighting function is defined as w(t).

5. The servo controlling device according to claim 4, wherein said combination optimizing method is a genetic algorithm.

* * * * *